United States Patent
Volkoff et al.

(10) Patent No.: US 8,238,549 B2
(45) Date of Patent: *Aug. 7, 2012

(54) EFFICIENT FULL OR PARTIAL DUPLICATE FORK DETECTION AND ARCHIVING

(75) Inventors: Serge Volkoff, San Bruno, CA (US); Darryl Lovato, Royal Oaks, CA (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 756 days.

This patent is subject to a terminal disclaimer.

(21) Appl. No.: 12/329,480

(22) Filed: Dec. 5, 2008

(65) Prior Publication Data

US 2010/0142701 A1 Jun. 10, 2010

(51) Int. Cl.
*H04L 1/00* (2006.01)
(52) U.S. Cl. ............. 380/28; 380/45; 380/269; 707/692
(58) Field of Classification Search .................... 380/28, 380/269, 45; 707/692
See application file for complete search history.

(56) References Cited

U.S. PATENT DOCUMENTS

| | | | |
|---|---|---|---|
| 6,240,409 B1 * | 5/2001 | Aiken ................................. | 1/1 |
| 6,374,266 B1 * | 4/2002 | Shnelvar .............................. | 1/1 |
| 7,519,635 B1 * | 4/2009 | Haustein et al. ..................... | 1/1 |
| 7,567,188 B1 * | 7/2009 | Anglin et al. .................. | 341/63 |
| 7,921,077 B2 * | 4/2011 | Ting et al. .................... | 707/610 |
| 7,996,371 B1 * | 8/2011 | Deshmukh ................... | 707/692 |
| 2006/0173692 A1 * | 8/2006 | Rao et al. ..................... | 704/503 |
| 2008/0133561 A1 * | 6/2008 | Dubnicki et al. ............. | 707/101 |
| 2008/0152235 A1 * | 6/2008 | Bashyam et al. ............. | 382/224 |
| 2009/0268903 A1 * | 10/2009 | Bojinov et al. ................ | 380/45 |
| 2009/0307251 A1 * | 12/2009 | Heller et al. .................. | 707/101 |
| 2009/0327625 A1 * | 12/2009 | Jaquette et al. ............... | 711/160 |

* cited by examiner

*Primary Examiner* — Nabil El Hady
(74) *Attorney, Agent, or Firm* — Craig M. Stainbrook; Stainbrook & Stainbrook, LLP

(57) ABSTRACT

A method to efficiently detect, store, modify, and recreate fully or partially duplicate file forks is described. During archive creation or modification, sets of fully or partially duplicate forks are detected and a reduced number of transformed forks or fork segments are stored. During archive expansion, one or more forks are recreated from each full or partial copy.

4 Claims, 5 Drawing Sheets

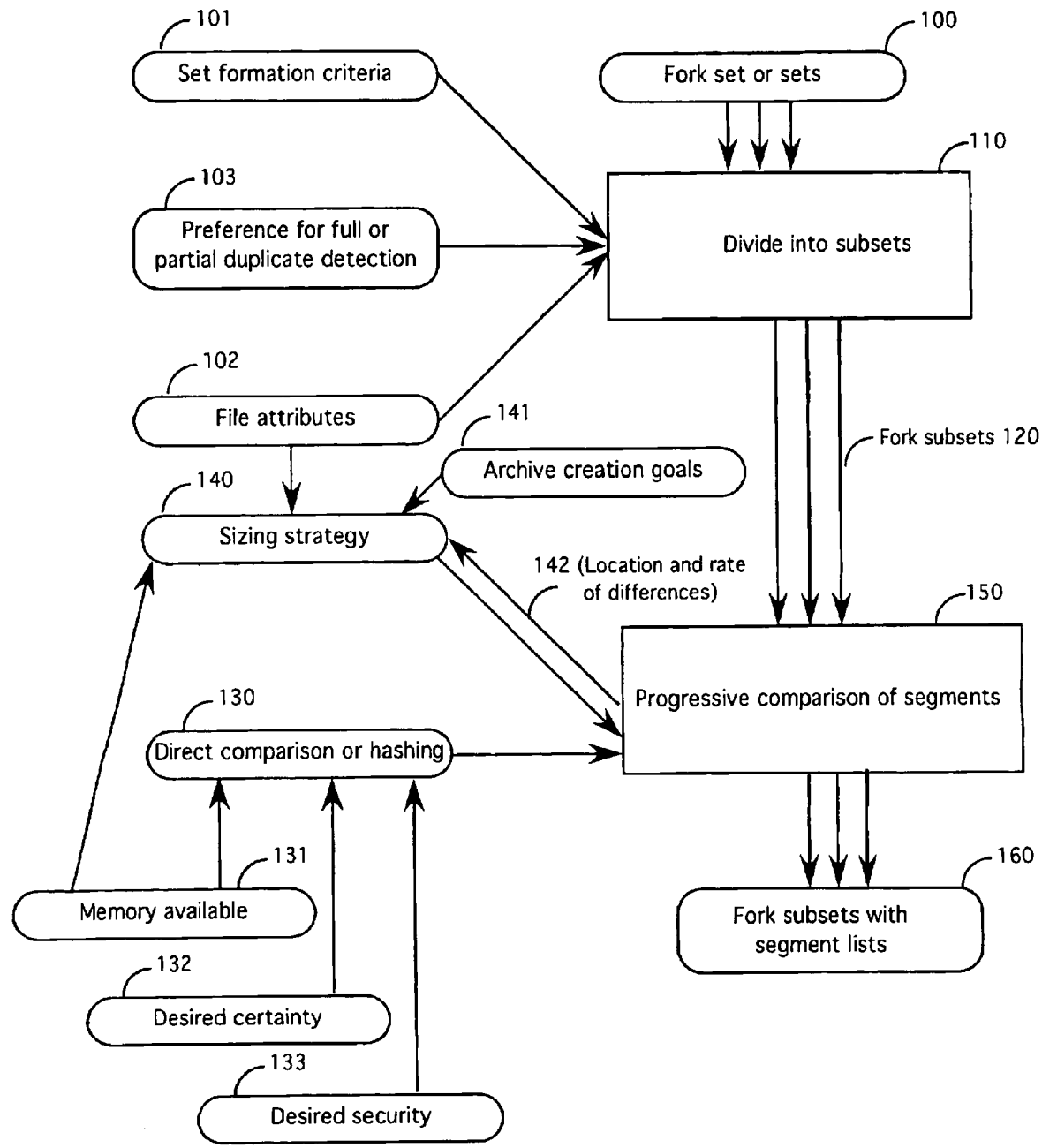
FIG._1

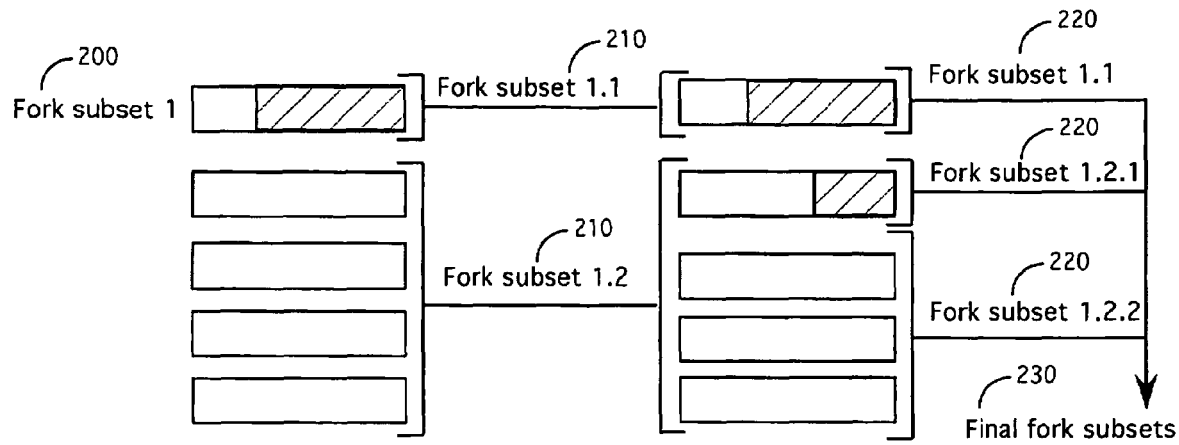
FIG. _2
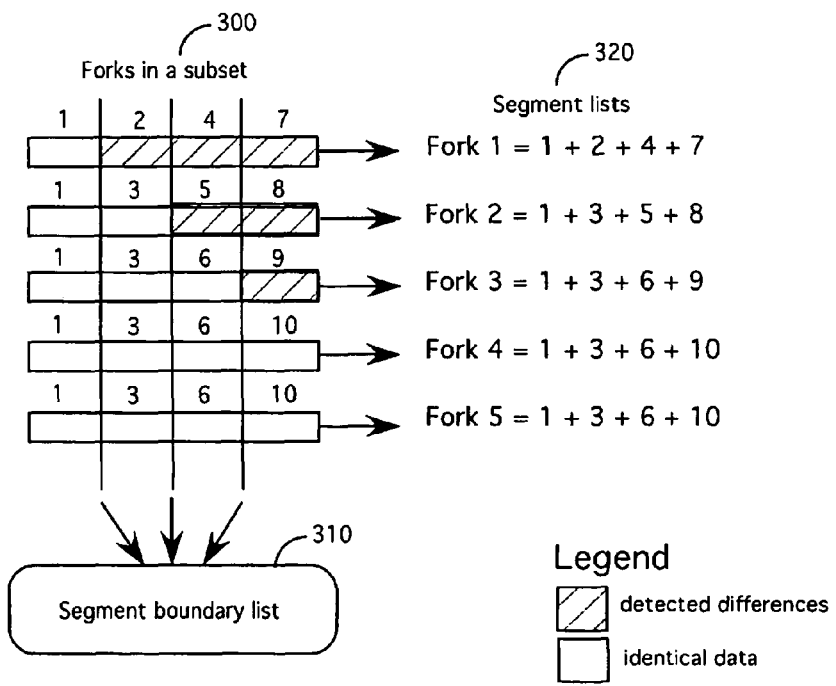
FIG. _3

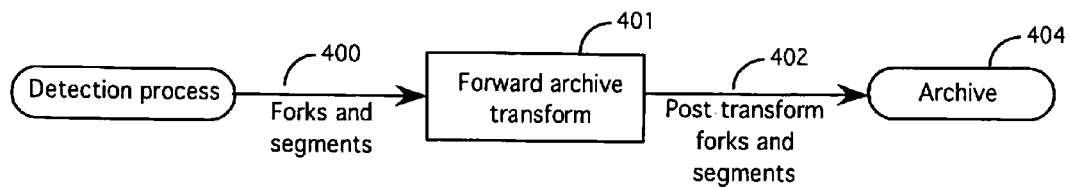
FIG._4A
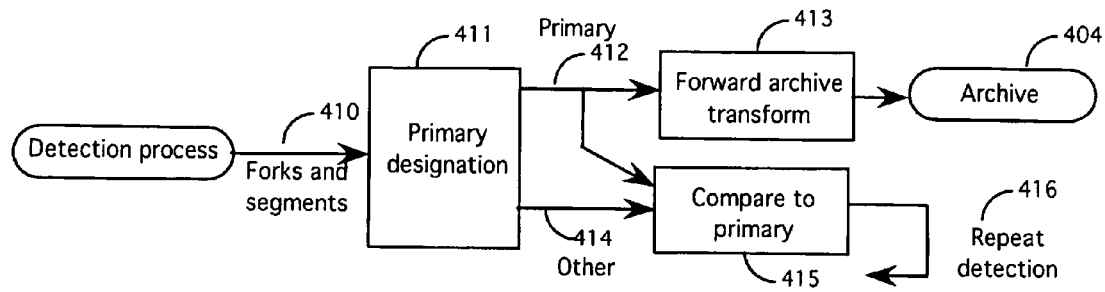
FIG._4B
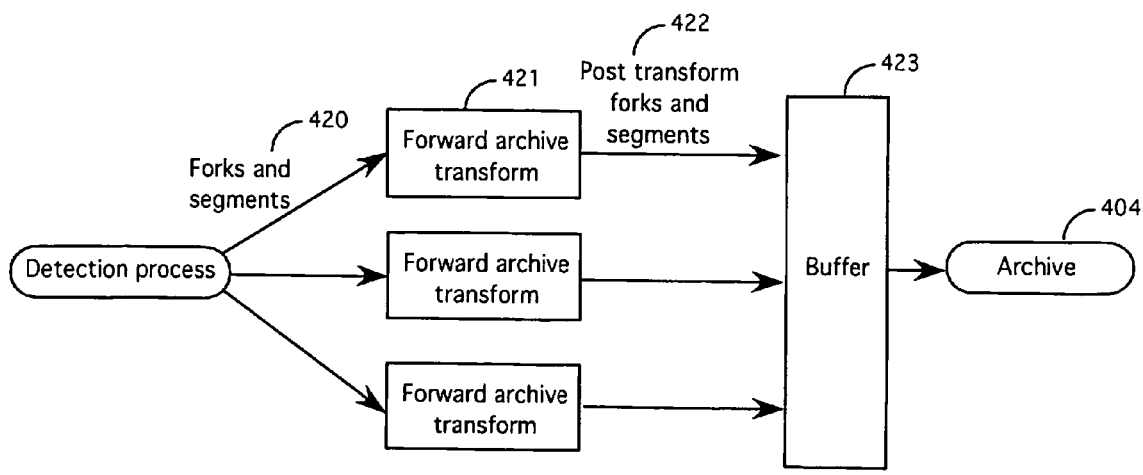
FIG._4C

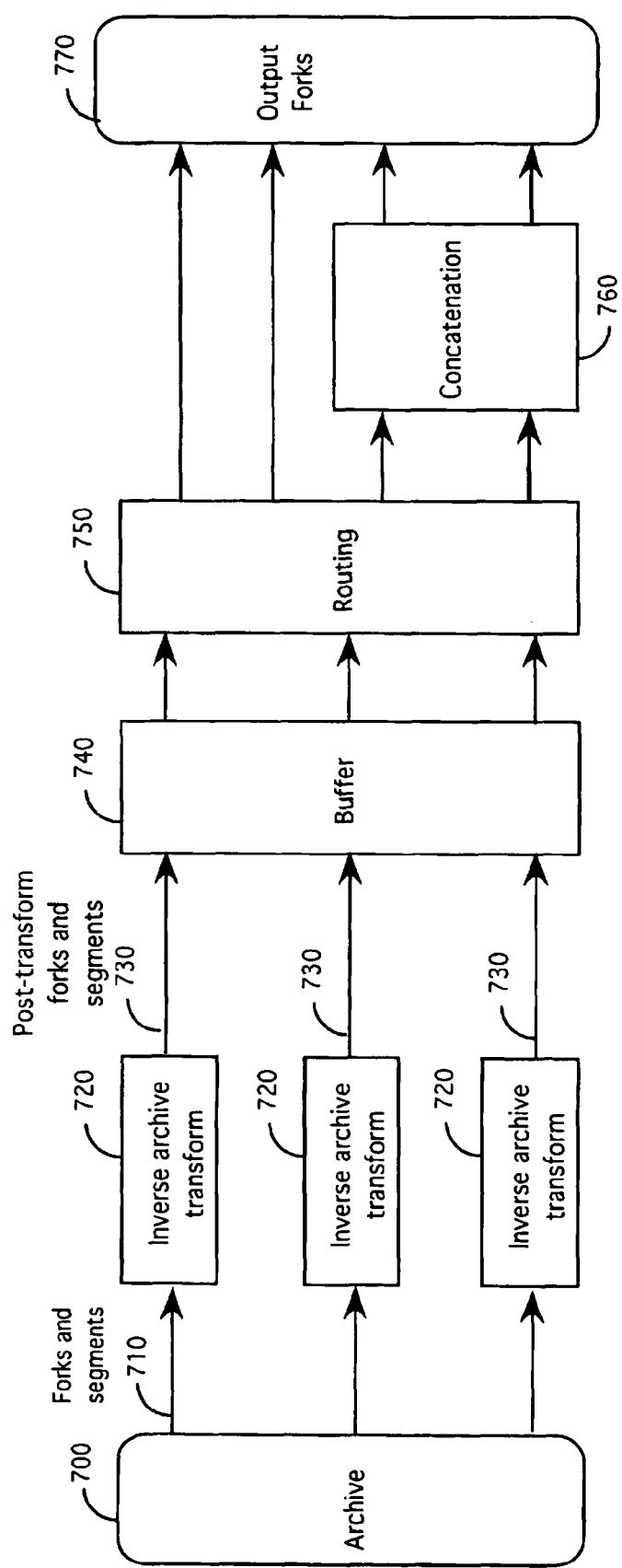
FIG._7

EFFICIENT FULL OR PARTIAL DUPLICATE FORK DETECTION AND ARCHIVING

CROSS REFERENCES TO RELATED APPLICATIONS

Not applicable.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates generally to data compression and archiving. More particularly the present invention relates to a system and method for efficiently detecting and storing multiple files that contain similar or identical data. Still more particularly, the present invention is a method for detecting and storing full or partial duplicate file forks in an archiving system.

2. Discussion of Related Art Including Information Disclosed Under 37 CFR §§1.97, 1.98

Archiving software utilities such as STUFFIT®, PKZIP®, RAR® and similar products provide users with the ability to combine or package multiple files into a single archive for distribution, as well as by compressing and encrypting the files, so that bandwidth costs and storage requirements are minimized when sending the resulting archive across a communication channel or when storing it in a storage medium. [STUFFIT is a registered trademark of Smith Micro Software, Inc., of Aliso Viejo, Calif.; PKZIP is a registered trademark of PKWare, Inc., of Milwaukee, Wis.; and RAR is a registered trademark of Eugene Roshal, an individual from Chelyabinsk, Russian Federation.]

Quite often the files added to an archive are exact duplicates of one another, or very nearly so. Current archiving software, such as the archiving software utilities mentioned above, compress each data file as a whole, without detecting duplicate or partially duplicate files or file forks. It would be advantageous, therefore, to provide a method for detecting when a subset of files being added to an archive are identical files, or nearly identical. Then, instead of compressing and storing additional copies of the file data, the method could provide means for storing references to compressed data already present in the first archived copy of the file. Moreover, it is desirable that the detection and coding of the identical files be as time efficient as possible.

Current products use the concept of a "solid archive" or "block mode" to partially solve this problem. In this mode, input files are sorted by file attributes so that potentially identical files are ordered close to each other, and the resulting files are concatenated and compressed as a single large block. In some instances, compressors take advantage of the presence of nearby identical data, but this approach is highly dependent on the window size or the amount of history available to the compression program. Multiple large identical files will not be able to reference the data in the matching files processed previously, if the beginning of the second file is too remote from the beginning of the first file. Additionally, even if the identical files are within the given window size and the history of the first file can be used in compressing the next file that matches, this method does nothing to eliminate processing—the second file or fork data must still be compressed.

BRIEF SUMMARY OF THE INVENTION

Accordingly, the present invention provides a system and method that efficiently detects identical or nearly identical files or forks, and rather than compress the second and subsequent occurrences of the duplicate data, the inventive method simply stores references to the first compressed copy. This process effectively compresses multiple copies of data by nearly 100% (only a small amount of reference information is stored), without repeated compression of the matching data.

Further, unlike the block or "solid" mode currently used by state of the art archiving products, the method of the present invention is not in any way dependent on the size of the files, the size of the file forks, the compression history, or the window size.

It must also be emphasized that while decompressing/extracting archived files, the present inventive method of storing references to the original data allows the extraction process to process only the first occurrence of the duplicated data. As matching files are encountered, this method simply copies the already decompressed first occurrences data to the appropriate forks in matching files.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty that characterize the invention are pointed out with particularity in the claims annexed to and forming part of this disclosure. The invention does not reside in any one of these features taken alone, but rather in the particular combination of all of its structures for the functions specified.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

Accordingly, before explaining the preferred embodiment of the disclosure in detail, it is to be understood that the disclosure is not limited in its application to the details of the method steps set forth in the following description or illustrated in the drawings. The inventive method described herein is capable of other embodiments and of being practiced and carried out in various ways.

As such, those skilled in the art will appreciate that the conception, upon which this disclosure is based may readily be used as a basis for designing other structures, methods, and systems for carrying out the several purposes of the present invention. It is important, therefore, that the claims are regarded as including such equivalent processes, procedures, and method steps, as far as they do not depart from the spirit and scope of the present invention. Rather, the fundamental aspects of the invention, along with the various features and functionality that characterize the invention, are pointed out with particularity in the claims annexed to and forming a part of this disclosure.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 1 is a schematic flow chart showing an overview of the duplicate detection process employed in the inventive method;

FIG. 2 is a schematic block diagram showing detection of fully duplicate forks;

FIG. 3 is a schematic block diagram showing detection of partially duplicate forks in a subset;

FIG. 4A is flow chart providing an overview of the fork and segment processing used by the inventive method for archiving storage in a direct comparison case;

FIG. 4B shows a hash-based detection method;

FIG. 4C shows an alternative method of the hash-based detection method;

FIG. 7 is a flow diagram showing archive expansion with sequential archive compution and sequential fork creation.

LEGEND

Drawings Reference Numerals FIGS. 1-7

Figure 5:
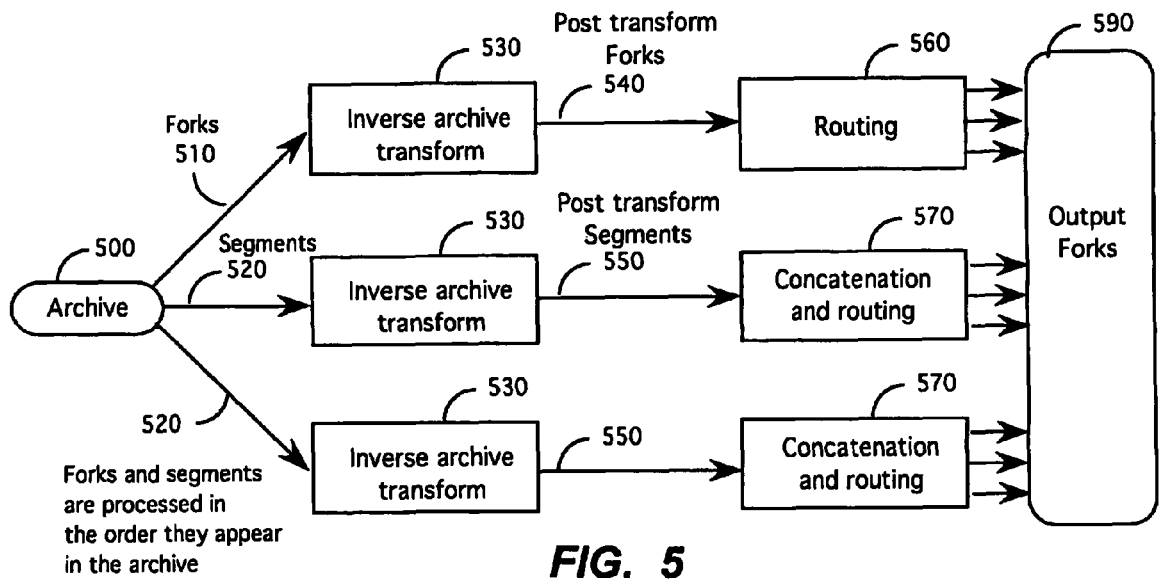
FIG. 5 is a flow diagram showing how the inventive method employs archive expansion with sequential archive consumption.

100 is the input (incoming fork set or sets) to the first preferred embodiment of the invention
101 set formation criteria
102 file attributes
103 preference for full or partial duplicate detection
130 direct comparison or hashing
131 memory available
132 desired certainty
133 desired security
140 sizing strategy
141 archive creation goals
142 location and rate of differences
150 progressive comparison of segments
160 output fork subsets with segment lists
200 fork subset 1
210 fork subset 1.1
220 fork subsets
230 final fork subsets
300 partially duplicate forks
310 segment boundary list
320 segment lists
400 forks and segments
401 forward archive transform
402 post transform forks and segments
404 archive
410 forks and segments
411 primary designation
412 primary fork
413 forward archive transform
414 other (than primary) forks
415 compare to primary
416 repeat detection
420 forks and segments
421 forward archive transforms
422 post transform forks and segments
423 buffer
500 sequential archive
510 forks
520 segments
530 inverse transform
540 post transform forks
550 post transform segments
560 routing
570 concatenation and routing
590 output forks
600 archive
610 forks
620 segments
630 inverse transform or transforms
640 post transform segments
650 concatenation
660 output forks
700 archive
710 forks and segments
720 inverse archive transform
730 post-transform forks and segments
740 buffer
750 routing
760 concatenation
770 output forks

DETAILED DESCRIPTION OF THE INVENTION

The invention will be better understood and objects other than those set forth will become apparent when consideration is given to the following detailed description thereof. Such description makes reference to the annexed drawings.

Definitions

As used herein, the following terms shall have the indicated definitions.

Fork: any data (a linear series of bytes) of certain size, also possessing a type, and associated with a file system object.

File: a set of one or more typed forks, also possessing optional attributes (including but not limited to directory, name, extension, type, creator, creation time, modification time, and access time).

Archive: a collection of files created for the purpose of storage or transmission, usually in compressed and/or otherwise transformed form; an archive consists of structural information and archive data.

Structural information: parts of an archive that contain information about stored files and forks (attributes, pre- and post-archive transform sizes and fork hash values).

Archive data: fork data in transformed form.

Archive creation: the process of combining multiple forks, files, and their attributes into an archive.

Archive expansion, full archive expansion: the process of recreating forks, files, and their attributes from an archive.

Partial archive expansion: an archive reading process where the amount of data to be read is limited, commonly including only structural information.

Fully duplicate forks: two or more forks of identical size and containing identical data.

Partially duplicate forks: two or more forks containing identical data at the beginning.

Apparently duplicate forks: forks that appear to be identical based on the result of a hashing transformation, yet containing some different data.

Difference point: a point, located in the process of partial duplicate detection, where two forks begin to differ.

Fork segment: a contiguous fork part between the beginning of the fork and the first difference point, or two intermediate difference points, or the last difference point and the end of the fork.

Archive transform, forward archive transform: transformation of data stored in an archive by application of algorithms including, but not limited to, compression, encryption, cryptographic signing, filtering, format detection, format-specific recompression, hash calculation, error protection, and forward error correction.

Inverse archive transform: transformation of data that is the inverse of the forward archive transform, by application of algorithms including but not limited to decompression, decryption, verification of cryptographic signatures, inverse filtering, format-specific decompression, hash verification, error detection, and error correction.

Hash: a deterministic, lossy data transformation that produces a fixed-size digest, or hash, from an arbitrarily long fork.

Cryptographically secure hash: a uniformly distributed hash transformation that is computationally difficult to reverse (i.e., find a fork with the given hash value).

Hash collision: a condition where two different forks produce identical results after the hash transformation.

Segment: part of a fork that is read and hashed in one operation.

Sizing strategy: an algorithm that determines segment sizes during fork comparison.

Description of Invention: When creating an archive from a set of forks, a straightforward way to detect full or partial duplicates is to compare all incoming forks.

Referring first to FIG. 1, efficient detection of fully or partially duplicate forks is achieved as follows: The overall set of forks to be stored in an archive is assembled into one set or several sets 100, divided 110 by a criterion or criteria 101 and fork attributes 102 including but not limited to attributes such as fork type or origin. The initial fork set or sets 100 are then sorted, and divided into subsets of forks 120 of equal size. If preference 103 is given to detecting approximate duplicates, lists are divided into subsets of forks 120 of nearly equal size.

Forks in each subset 120 are subjected to comparison 150, directly or by a hash algorithm.

The choice of whether to compare data directly or by a hash algorithm 130 is based on the sizing strategy 140, the amount of memory 131 available for the compare operation, the desired certainty of duplicate detection 132, and the desired protection against intentional injection of apparently duplicate forks 133. The use of a hashing algorithm permits operation on arbitrarily large segments.

Referring next to FIG. 2, the comparison procedure is seen to be iterative, and direct comparison or hash computation proceeds on all forks of a subset in parallel. If the goal is to detect only fully duplicate forks, subsets 200 are further subdivided into subsets 210, 220 when differences in segment data 230 or accumulated hash values are detected. If the goal includes detecting partially duplicate forks 300 as well, a boundary list 310 and segment lists 320 are formed, one per each fork in a subset that includes one or more partially duplicate fork pair(s). Each segment list 320 contains or points to common copies of locations and sizes of fork segments that constitute the fork. This is shown in FIG. 3.

Alternatively, differences between forks or fork segments are encoded by a differencing algorithm (also known as delta encoding) that produces a patch, or a compact description of differences between two forks or fork segments.

Fork data is processed in segments of equal or variable (typically, increasing) size, determined by a sizing strategy 140. The sizing strategy is based on (1) a priori knowledge of fork structure and attributes 102, and/or (2) archive creation goals 141 (which include but are not limited to maximizing creation, modification, or expansion speed, minimizing archive size, or a combination of such goals).

A sizing strategy with smaller, fixed, or slowly growing segment sizes is best suited for unknown fork data where expected locations of differences are unknown but need to be located in a relatively precise fashion.

A different sizing strategy may be favored for reading fork data from hard drives where switching between forks during reading leads to a reduction in data throughput and an increase in operational acoustic level. A sizing strategy with fast growing segment sizes may be best suited as a compromise between reading/acoustic efficiency and precision of locating fork differences.

Additionally, an adaptive sizing strategy may vary the rate of segment growth depending on the detection progress parameters including but not limited to the locations of differences and/or the rate at which differences are found 142.

If a hash algorithm is used for detecting differences, and fork data needs to be protected against intentional injection of apparently duplicate forks, then a cryptographically secure hashing algorithm is used.

When the comparison is complete, the resulting subsets 160, 220 and segment lists 320 contain forks and fork segments with identical hash values. At this stage, fork segments within each subset are either certain (when direct comparison of forks was used) or nearly certain (when a hash algorithm was used) to be duplicates. Because the probability of hash collisions can be made arbitrarily small by using longer hash values, the latter may provide a sufficient degree of certainty that forks are indeed identical.

Fork and segment data is processed by the forward archive transform for addition to the archive.

Referring next to FIG. 4A, if direct comparison of forks was used, one of the duplicate forks or segments in each subset 400 is processed by the forward archive transform 401 into post-transform data 402 for immediate or delayed addition to the archive 403.

As seen in FIG. 4B, if a hash algorithm was used and perfectly certain and/or perfectly secure duplicate fork detection is desired, further steps 410-416 or 420-423 are required.

One of the forks or segments 410 is given a designation 411 of the primary fork or segment 412 and is processed by the forward archive transform 413, while other forks 414 from its subset are being read and compared to primary 415, up to their respective ends or difference points. A sizing strategy identical or similar to the earlier sizing strategy 140 is utilized, with difference points added as additional segment boundaries. If differences are detected, transformed output is discarded, differing forks are separated into new subsets for a repeat duplicate detection 416.

FIG. 4C shows that if enough temporary storage is available, in an alternative method of the hash-based detection method, all forks or segments 420 are processed by the forward archive transform 421 in parallel and post-transform data forks and segments 422 are buffered 423 until all forks or segments are fully transformed. Pre-420 or post-422 transform data is compared during this processing. If no differences are detected, a memory-saving strategy may discard multiple copies of matching post-transform data 423. If differences are detected, more than one buffered post-transform output must be retained for immediate or delayed addition to the archive. If a memory-saving strategy was used, additional copies of the matching (up to the point of each difference) portions of post-transform data are retained. This can be done directly by keeping multiple copies, or indirectly by keeping unique segments of post-transform data and the order in which they appear in each indirectly retained post-transform data stream.

Structural information that describes sets of unique and duplicate fork segments achieved in stage 3 or 4 of the creation process must be created or updated to reflect the final lists of fork segments. Structural information includes one or more if the following: overall pre-transform and post-transform fork sizes and locations of unique, transformed fork data in archive data.

Structural information that describes subsets of fully duplicate forks 220 consists of identical size and location data for all forks in a subset.

Structural information that describes subsets of partially duplicate forks 300 consists of sizes and/or locations 310 for fork segments corresponding to difference points, and lists of segments 320 that, when concatenated in listed order, reconstitute original forks.

If redundancy is acceptable, structural information is stored separately for each fork. For redundancy reduction, lists are organized hierarchically and/or encoded with a statistical model and an entropy coder.

If the possibility of sequential whole-archive expansion is a desired property of an archive, all fork structural information must precede fork data it describes.

Method of handling duplicate forks during archive expansion: Structural information for individual forks must be located and interpreted during expansion.

In FIG. 5, we see that if sequential archive 500 consumption is desired during expansion, pre-inverse transform data consisting of forks 510 and segments 520 is processed by inverse transform or transforms 530. Post-inverse transform data in the form of fully 540 or partially 550 duplicate forks 540, 550 is routed 560 (split into multiple identical data streams) and/or concatenated 570 to form one or more forks consisting of one or more fork segments. This may be achieved by either writing post-inverse transform data in parallel to multiple files, or by writing to one file (corresponding to a full fork or a collection fork segment), and making copies of this file's contents after its corresponding full fork or fork segments have been fully reconstructed by the inverse transform(s).

Figure 6:
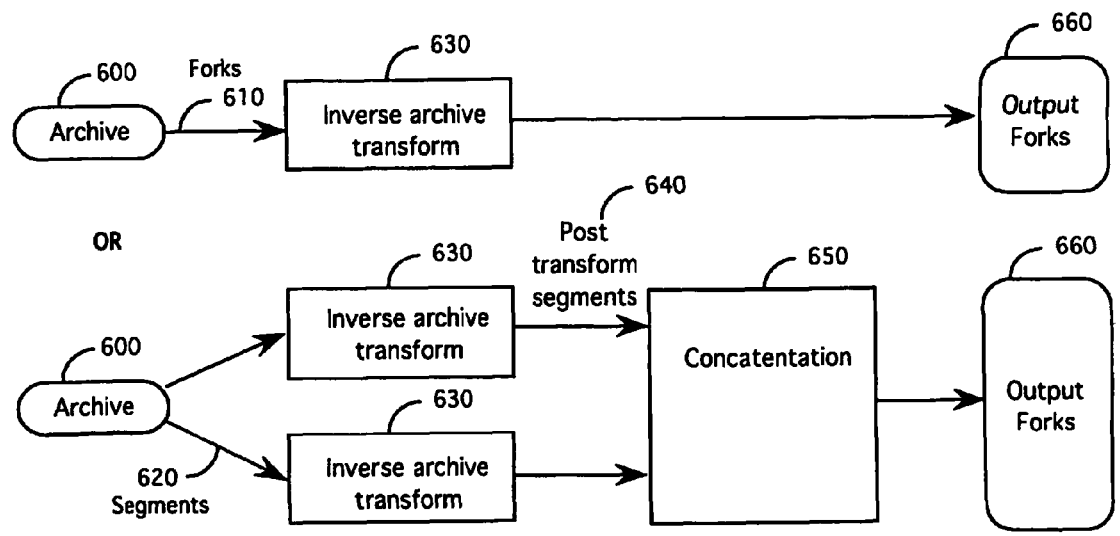
FIG. 6 is a flow diagram showing archive expansion with sequential archive consumption and non-sequential fork creation.

In FIG. 6, we see that if sequential fork 660 creation is desired and non-sequential archive 600 consumption is possible or permitted, duplicate forks 660 are reconstituted independently by processing pre-inverse transform data consisting of forks 610 and segments 620 by an inverse transform or transforms 630. Segments 640 that form partially duplicate forks are concatenated 650 after the inverse transform application.

Next, referring to FIG. 7, when only sequential archive 700 consumption is possible or permitted, and sequential fork 770 creation is desired, pre-inverse transform data 710 is processed by an inverse transform or transforms 720 and post-inverse transform data 730 is retained by a buffer 740 before being routed 750 and concatenated 760 into output forks 770.

Alternatively, if the differences between forks or fork segments were encoded by a differencing algorithm, a patch transformation (the inverse of the differencing transformation) is used to produce a new fork or fork segment.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A method of detecting fork differences in which fork data is protected against the injection of duplicate forks, comprising the steps of:
   comparing fork segments with a cryptographically secure hashing algorithm;
   creating subsets and segment lists of duplicate forks and fork segments, and wherein after comparison is complete, either further hashing the resulting subsets and segment lists containing identical hash values for fork and fork segments using a longer hash value to provide an additional degree of certainty, or directly comparing the forks and fork segments to make sure the forks or fork segments are indeed identical;
   processing the resulting fork and fork segments by a forward archive transform for addition to the archive;
   wherein when a direct comparison of forks is used, the method includes the step of processing one of the duplicate forks or segments in each subset by the forward archive transform into post transform data for immediate or delayed addition to the archive;
   and further wherein when a hash algorithm for comparing forks is used, and perfectly certain or secure duplicate fork detection is desired, the method includes the further steps of designating one of the forks or segments as the primary fork or segment; processing the primary fork or segment by the forward archive transform while reading and comparing it to others from its subset, up to their respective ends or difference points; utilizing a sizing strategy with difference points added as additional segment boundaries; and if differences are detected, discarding transformed output and separating differing forks into new subsets for a repeat duplicate detection.

2. The method of claim 1, wherein when enough temporary storage is available, the method includes the further steps of:
   processing all forks or segments by the forward archive transform in parallel;
   buffering post-transform data until all forks or segments are fully transformed; and
   concurrently comparing pre-transform or post-transform data.

3. The method of claim 2, wherein when no differences are detected, the method includes the step of discarding multiple copies of matching post-transform data using a memory-saving strategy, and when differences are detected, retaining more than one buffered post-transform output for immediate or delayed addition to the archive.

4. The method of claim 2, wherein when a memory-saving strategy is used, the method includes the step of retaining additional copies of the matching (up to the point of each difference) portions of post-transform data, either directly by keeping multiple copies, or indirectly by keeping unique segments of post-transform data and the order in which they appear in each indirectly retained post-transform data stream.

* * * * *